(12) United States Patent
Dribinski et al.

(10) Patent No.: US 9,980,187 B2
(45) Date of Patent: May 22, 2018

(54) METHOD OF OPTIMIZING A CELLULAR NETWORK AND SYSTEM THEREOF

(71) Applicant: Cellwize Wireless Technologies Ltd., Tel Aviv (IL)

(72) Inventors: Daniel Dribinski, Rishon Lezion (IL); Evgeny Finkel, Petah-Tikva (IL); Rafael Shachar, Shimshit (IL)

(73) Assignee: Cellwize Wireless Technologies Ltd., Tel Aviv (IL)

( * ) Notice: Subject to any disclaimer, the term of this patent is extended or adjusted under 35 U.S.C. 154(b) by 0 days. days.

(21) Appl. No.: 15/603,585

(22) Filed: May 24, 2017

(65) Prior Publication Data

US 2017/0347299 A1    Nov. 30, 2017

Related U.S. Application Data

(60) Provisional application No. 62/341,154, filed on May 25, 2016.

(51) Int. Cl.
*H04W 36/00* (2009.01)
*H04W 36/08* (2009.01)
(Continued)

(52) U.S. Cl.
CPC ....... *H04W 36/0088* (2013.01); *H04W 24/02* (2013.01); *H04W 24/10* (2013.01);
(Continued)

(58) Field of Classification Search
CPC ......... H04W 36/0061; H04W 36/0083; H04W 36/00; H04W 36/0016; H04W 52/0206;
(Continued)

(56) References Cited

U.S. PATENT DOCUMENTS 7,924,788 B2 * 4/2011 Ore ................. H04W 36/0083
                                                       370/331
8,649,791 B1    2/2014 Wohld
(Continued)

OTHER PUBLICATIONS

Dahlen, A., Johansson, A., Gunnarsson, F., Moe, J., Rimhagen, T., & Kallin, H. (May 2011). Evaluations of LTE automatic neighbor relations. In Vehicular Technology Conference (VTC Spring), 2011 IEEE 73rd (pp. 1-5). IEEE.
(Continued)

*Primary Examiner* — Meless Zewdu
(74) *Attorney, Agent, or Firm* — Wiggin and Dana LLP; Gregory S. Rosenblatt; Andrew D. Bochner

(57) ABSTRACT

There are provided a system and method of computerized optimizing neighbor relation tables (NRTs) of access points in a cellular network comprising a plurality of access points (APs). The method comprises: a) obtaining initial handover-related estimations for AP pairs each constituted by a given source AP and its neighbouring APs located in a predefined range and thereby considerable as candidates for an NRT of the given AP; b) generating a handover (HO) prediction model; c) using the generated HO prediction model to assess HO-related counts for each AP pair of the AP pairs; d) using the assessed HO-related counts to generate, by the computer, data usable for NRT optimization; and e) enabling modifying at least one NRT in accordance with the generated data.

20 Claims, 7 Drawing Sheets

(51) Int. Cl.
*H04W 24/02* (2009.01)
*H04W 24/10* (2009.01)
*H04W 28/08* (2009.01)
*H04W 88/08* (2009.01)
*H04W 84/04* (2009.01)

(52) U.S. Cl.
CPC ............ *H04W 28/08* (2013.01); *H04W 36/08* (2013.01); *H04W 84/042* (2013.01); *H04W 88/08* (2013.01)

(58) Field of Classification Search
CPC . H04W 52/42; H04W 52/50; H04W 72/0426; H04W 88/08; H04W 92/20; H04W 88/10; H04W 16/00; H04W 16/18; H04W 16/20; H04W 36/0094; H04W 16/02; H04W 36/0072; H04W 36/0088; H04W 36/08; H04W 24/02; H04W 84/042; H04W 28/06; H04W 28/08; H04W 24/10; H04W 8/087; H04W 28/0226; H04W 4/02; H04W 36/06
See application file for complete search history.

(56) References Cited

U.S. PATENT DOCUMENTS

| | | | |
|---|---|---|---|
| 9,432,901 B1* | 8/2016 | Kwan | H04W 36/245 |
| 2002/0168982 A1* | 11/2002 | Sorokine | H04W 4/02 |
| | | | 455/441 |
| 2004/0266352 A1* | 12/2004 | Kuurne | H04W 16/28 |
| | | | 455/67.11 |
| 2007/0086387 A1* | 4/2007 | Kang | H04B 7/2606 |
| | | | 370/331 |
| 2012/0040662 A1 | 2/2012 | Rahman et al. | |
| 2012/0315895 A1 | 12/2012 | Jovanovic et al. | |
| 2013/0023286 A1* | 1/2013 | Soma | H04W 4/02 |
| | | | 455/456.1 |
| 2013/0188624 A1* | 7/2013 | Lee | H04W 24/02 |
| | | | 370/338 |
| 2015/0208297 A1 | 7/2015 | McLaughlin et al. | |
| 2017/0055186 A1* | 2/2017 | Donepudi | H04W 36/0061 |

OTHER PUBLICATIONS

Radio Technical Reference Design Guide—Circuit Design, Inc (retrieved from http://www.cdt21.com/resources/siryo4.asp).

* cited by examiner

METHOD OF OPTIMIZING A CELLULAR NETWORK AND SYSTEM THEREOF

CROSS-REFERENCES TO RELATED APPLICATIONS

The present application claims benefit from U.S. application No. 62/341,154 filed on May 25, 2016 incorporated hereby by reference in its entirety.

TECHNICAL FIELD

The presently disclosed subject matter relates generally to systems and methods of cellular communication and, in particular, to systems and methods of optimizing a cellular network.

BACKGROUND

Mobile operators face a growing need for high reliability mobility across cellular networks. The number of dropped calls or other abnormal discontinuations of radio service can be minimized by effective handover operations. Handover operations enable a user to maintain a call and/or data sessions when travelling in and out of the effective ranges of cells, enable interoperability in multi-RAT (Radio Access Technology) and multi-band cellular communication environment, and allow efficient sharing of network resources, avoiding interference, etc.

Problems of optimizing handover process in cellular networks have been recognized in the conventional art and various techniques have been developed to provide solutions. For example:

US Patent Application No. 2012/040662 discloses subject matter relating to an architecture that can redirect communications upon detection of a handover failure in a Long Term Evolution (LTE) network. In particular, the architecture can obtain information indicative of a handover failure that is available in a first portion of the LTE network that has no control over the communication path. Furthermore, the architecture can utilize the information to instruct a second portion of the LTE network, one that can control the communication path but conventionally has no access to the information, to reroute the communication path to avoid unresponsive or failing network entities.

US Patent Application No. 2012/315895 discloses a method for identifying a missing neighbor in a wireless network. The method includes receiving a report about two or more pilot signals measured by a mobile station; determining that one or more of the reported pilot signals is a missing neighbor not comprised in a current neighbor list of the mobile station; choosing one or more candidate sectors having a pilot signal with the same pilot identity as the missing neighbor; and selecting a most likely sector as the missing neighbor from the one or more candidate sectors, based on calculated distances between the mobile station and a source sector, between the mobile station and at least one of the one or more candidate sectors, and between the source sector and at least one of the one or more candidate sectors, so as to identify the missing neighbor in the wireless network.

US Patent Application No. 2015/208297 discloses a technique of dynamically modifying neighbor lists for cells within telecommunications networks and/or modifying neighbor lists based on determined radio frequency coupling between cells. In some embodiments, the technique includes accessing a neighbor list associated with a target cell or associated with one or more neighbor cells of the target cell within a network, applying one or more dynamic optimization rule sets to the target cell, and modifying a neighbor list associated with the target cell or with neighbor cells to the target cell based on the applied rule sets.

U.S. Pat. No. 8,649,791 discloses developing a list of neighbor cells for a base station of a LTE mobile communication network based on distance information of neighboring cells; processing location data identifying location of the base station for which the list of neighbor cells is to be developed and locations of other base stations and determining distance between the base station and each respective one of the other base stations; ordering identification data of the other base stations based on at least in part determined distances; and compiling the list of neighbor cells for the base station to include the ordered identification data for a selected number of nearest ones of the other base stations, based on, at least in part, the determined distances.

The article "Evaluations of LTE Automatic Neighbor Relations", Anders Dahlén et al., 1st IEEE Workshop on Autonomic Wireless Access, 2011 discloses methods for automatic configuration of neighbor cell relations and evaluates Automatic Neighbor Relations (ANR) in a pre-launch, commercially deployed network cluster.

The references above teach many principles of the handover process and optimizing thereof that are applicable to the presently disclosed subject matter. Therefore the full contents of these publications are incorporated by reference herein for teachings, where appropriate, of additional or alternative details, features and/or technical background.

GENERAL DESCRIPTION

In accordance with certain aspects of the presently disclosed subject matter, there is provided a computerized method of optimizing neighbor relation tables (NRTs) of access points in a cellular network comprising a plurality of access points (APs). The method comprises: a) obtaining, by a computer, initial handover-related estimations for AP pairs each constituted by a given source AP and its neighboring APs located in a predefined range and thereby considerable as candidates for an NRT of the given AP; b) generating, by the computer, a handover (HO) prediction model; c) using the generated HO prediction model to assess, by the computer, HO-related counts for each AP pair of the AP pairs; d) using the assessed HO-related counts to generate, by the computer, data usable for NRT optimization; and e) enabling, by the computer, modifying at least one NRT in accordance with the generated data.

The generated prediction model can comprise a first sub-model configured to predict missing neighbor events counts and a separate second sub-model configured to predict HO attempts counts.

The method can further comprise: prior to obtaining initial HO-related estimations, classifying the APs of the plurality of APs by area density and AP type, thereby obtaining classified AP pairs; and providing operations a)-e) above for classified AP pairs.

In accordance with further aspects of the presently disclosed subject matter, the initial HO-related estimation of a given AP pair can be provided as a predefined function of initial geo-impact determined to the given pair and an average number of measured events related to handover from respective source AP, wherein geo-impact quantifies a degree of radio frequency coupling between a source AP and a neighbor AP.

In accordance with further aspects of the presently disclosed subject matter, the prediction model can generated based on one of the following: a) data informative of all neighboring APs located in a predefined range from source APs and b) data informative of subsets of neighboring APs, the subsets selected in accordance with predefined criteria.

In accordance with further aspects of the presently disclosed subject matter, generating the prediction model can comprise training the prediction model using different weights for HO-related events originated by clients having different priorities for a cellular operator.

In accordance with further aspects of the presently disclosed subject matter, the data usable for NRT optimization can be informative of missing neighbors of a given source AP, wherein generating said data can comprise ranking candidates for the NRT of the given AP, and defining a missing neighbor as a candidate missing in the NRT whilst having a rank higher than a candidate presented in the NRT. Alternatively or additionally, the data usable for NRT optimization can be informative of incorrectly defined neighbors included in the at least one NRT. Alternatively or additionally, the data usable for NRT optimization are usable in a network shared between two or more cellular operators, wherein each operator has partial access to HO-related data. Alternatively or additionally, the data usable for NRT optimization are usable for initial setting of load balancing parameters for newly added cells. Alternatively or additionally, the data usable for NRT optimization are usable to prioritize services between clients having different priorities for a cellular operator.

In accordance with further aspects of the presently disclosed subject matter, there is provided a computerized system capable of generating data usable for optimizing neighbor relation tables of access points in a cellular network comprising a plurality of access points (APs). The system comprises a processor operatively connected to a memory, wherein the processor is configured to: obtain initial handover-related (HO) estimations for AP pairs each constituted by a given source AP and its neighboring APs located in a predefined range and thereby considerable as candidates for an NRT of the given AP; generate a handover (HO) prediction model; use the generated HO prediction model to assess, by the computer, HO-related counts for each AP pair of the AP pairs; use the assessed HO-related counts to generate data usable for NRT optimization, and enable modifying at least one NRT in accordance with the generated data. The processor can be further configured to calculate the initial HO-related estimation of a given AP pair using a predefined function of initial geo-impact determined to the given pair and of an average number of measured events related to handover from respective source AP.

In accordance with further aspects of the presently disclosed subject matter, the system can be configured to obtain at least part of the initial HO-related estimation by receiving the estimations from an external source.

In accordance with further aspects of the presently disclosed subject matter, the system can further comprise a hardware-based network interface configured to continuously receive network-related data from one or more network depositories, wherein the memory can be configured to accommodate the received network-related data and/or derivatives, and wherein the processor can be further configured to process the received network-related data to derive data indicative of HO-related events registered during a certain period.

In accordance with further aspects of the presently disclosed subject matter, the memory can be configured to accommodate a data structure comprising, for each given source AP, HO-related counts for all pairs constituted by the given source AP and neighboring APs located in the predefined range.

In accordance with further aspects of the presently disclosed subject matter, the data usable for NRT optimization can be selected from a group consisting of: data informative of missing neighbors of a given source AP; data informative of incorrectly defined neighbors included in the at least one NRT; data usable in a network shared between two or more cellular operators, wherein each operator has partial access to HO-related data; and data usable for initial setting of load balancing parameters for newly added cells.

In accordance with further aspects of the presently disclosed subject matter, the system can be configured to provide the generated data to an Automatic Neighbor Relation (ANR) system which generates the optimized NRTs accordingly. Alternatively or additionally, the system can be configured to use the generated data to generate the optimized NRTs and to enable replacement of existing NRTs via an Operation and Support System (OSS).

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "computing", "calculating", "determining", "generating", "identifying", "classifying", or the like, refer to the action and/or processes of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the network information system disclosed in the present application.

The operations in accordance with the teachings herein may be performed by a computer specially constructed for the desired purposes or by a general-purpose computer specially configured for the desired purpose by a computer program stored in a computer readable storage medium.

It is to be understood that the term "non-transitory" is used herein to exclude transitory, propagating signals, but to include, otherwise, any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

Figure 1:
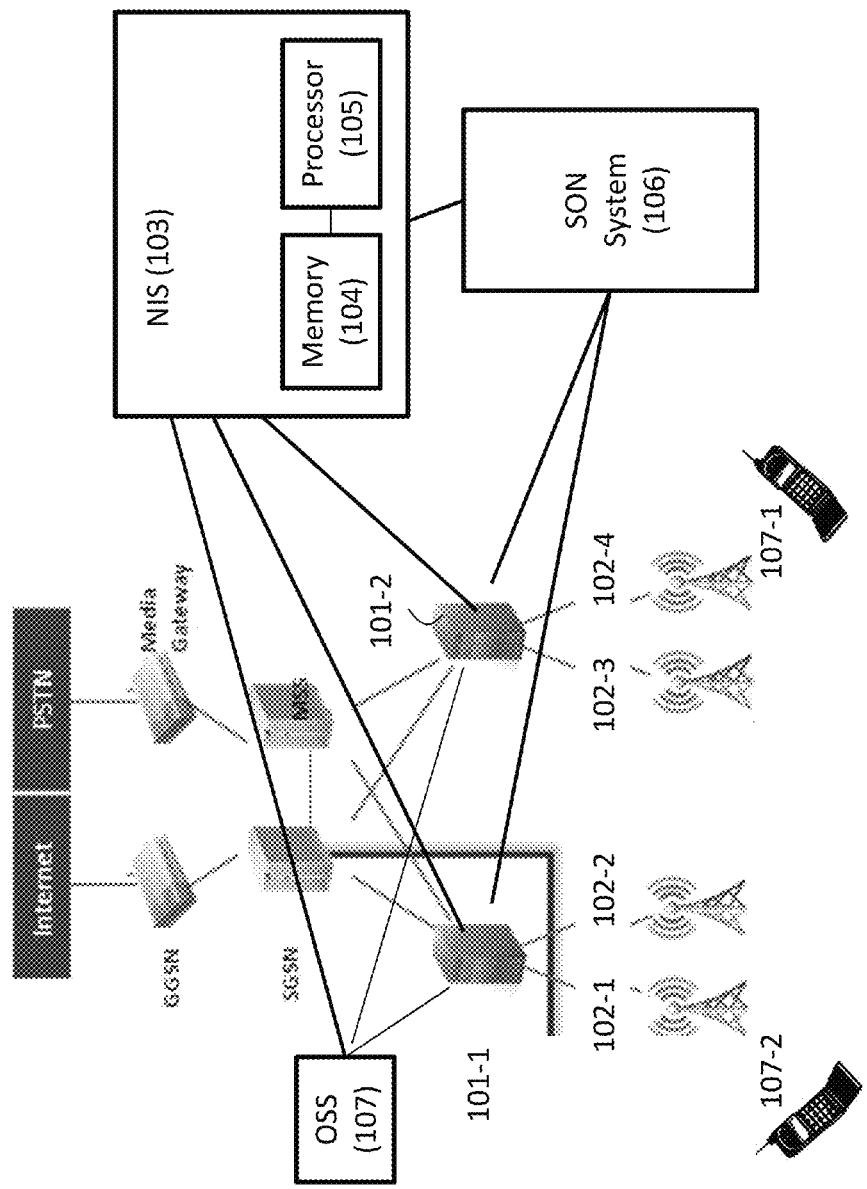
FIG. 1 illustrates a generalized network environment including a network information system configured in accordance with certain embodiments of the presently disclosed subject matter.

Bearing this in mind, attention is drawn to FIG. 1 illustrating a non-limiting example of a schematic network environment including a Network Information (NI) System configured in accordance with certain embodiments of the presently disclosed subject matter. As illustrated in FIG. 1, the cellular network comprises a plurality of access points (e.g. sectors as, for example, macrocells, picocells, femtocells, etc. and/or groups thereof as, for example, base stations, NodeBs, etc.) denoted as 102-1-102-4). The access points can operate in different bands and/or RATs and can be provided by different vendors. The access points (APs) serve connected UEs (user equipment) (denoted as 107-1-107-2) and/or are associated with idle UEs. The UEs are connected to APs via radio frequency (RF) channels allowing bidirectional transmission of voice and/or data between the APs and UEs.

The access points are operatively connected to one or more network resource controllers (NRCs) (e.g. Radio Network Controllers (RNCs), Mobile Management Entities (MMEs), etc.) provided by one or more vendors (denoted as 101-1-101-2).

As further detailed with reference to FIG. 2, each of access points 102-1-102-4 serves a certain geographic area (respectively denoted as 201-1-201-4). Handover (HO) is a procedure that enables a UE to keep continuous voice and/or data transmission when moving out of the coverage area of one AP (referred to hereinafter as a source AP) into the coverage area of another AP (referred to hereinafter as a target AP). Potential handover area between AP 102-1 and AP 102-2 is denoted as 202-1, potential handover area between AP 102-1 and AP 102-3 is denoted as 202-2, potential handover area between AP 102-2 and AP 102-3 is denoted as 202-3, and potential handover area between AP 102-32 and AP 102-4 is denoted as 202-4.

To facilitate HO, most modern wireless networks rely on measuring AP-specific signals (known as pilot signals or reference signals). Throughout the connection, UE searches for pilot signals coming from surrounding APs, measures characteristics of detected pilot signals (e.g. power, signal-to-noise ratio, distance, etc.), and reports the measurement results to NRC. NRC analyzes the received measurements and, when HO criteria are met, initiates an HO process to an AP with a suitable pilot signal.

Each given AP is associated with a respective neighbor relation table (NRT). For a given AP, NRT specifies APs that are likely HO target candidates (referred to hereinafter also as HO candidates) within the coverage area of the given AP and respective pilot signals thereof. The HO process is initiated from the given AP to an AP specified in the NRT and meeting handover criteria (e.g. HO strength criteria).

Due to different reasons (e.g. prediction errors, inaccuracies in signal propagation model, inaccuracies in data used in a manual planning step, etc.), some of potential HO candidates included in a given NRT can be invalid candidates, while some valid HO candidates can be missing.

Figure 2:
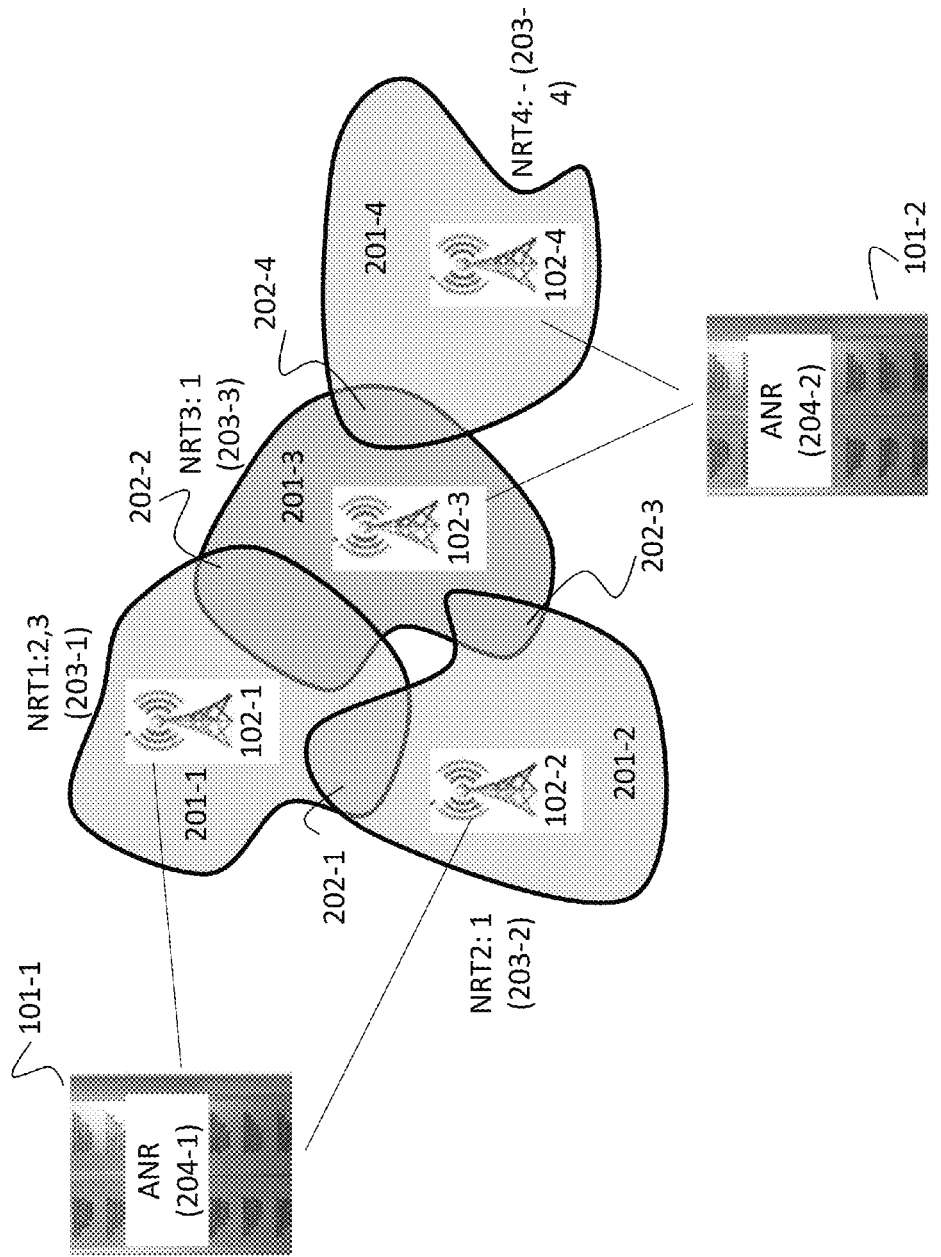
FIG. 2 presents a schematic diagram illustrating an exemplified handover configuration between access points.

In the non-limiting example illustrated in FIG. 2, AP 102-1 has a complete knowledge of its neighbors (NRT 203-1 includes data related to 102-2 and 102-3). NRT 203-2 associated with AP 102-2 erroneously includes only AP 102-1 and not AP 102-3, likewise NRT 203-3 associated AP 102-3 only includes AP 102-1 and not AP 102-2. AP 102-4 is illustrated as a newly installed access point and NRT 203-4 associated with AP 102-4 is not aware of any neighbors, while NRT 203-3 is further not aware of AP 102-4.

In the illustrated example, NRT 203-2 misses AP 102-3 as the valid candidate. Accordingly, a UE located in area 202-3 can measure a pilot signal from AP 102-3 fitting HO strength criteria; however handover from AP 102-2 to AP 102-3 cannot be executed (such an event is referred to hereinafter as a "missing neighbor event" and respective target AP is referred to as a "missing neighbor"). Respective calls may experience deteriorated quality due to unnecessary interference, and could eventually be dropped. By way of non-limiting example, missing neighbor events can be identified in accordance with a rate of dropped calls handed over from a given AP, and analyses of set reports comprising neighbor cell identifying information along with signal strength and interference measurements, etc.

In addition to the problem of missing neighbors illustrated in FIG. 2, NRT may have invalid HO candidates. By way of non-limiting example, invalid HO candidates can result from mis-assignments of pilot signals to wrong APs and/or from pilot reuse when the same pilot signal is associated with different HO candidates in the same NRT. Such inaccuracies can cause call drops and failed call attempts.

NRT planning can be provided manually, based on drive/walk tests, and/or can be performed by ongoing automated optimizations of neighbor lists. As illustrated in FIG. 2, network resource controllers 101-1 and 101-2 can comprise automatic neighbor relation (ANR) systems (denoted, respectively, as 204-1 and 204-2) configured to dynamically modify NRTs associated with respective APs. Alternatively or additionally, ANR systems can be located at Access Points. In accordance with certain embodiments of the currently disclosed subject matter, ANR system can be configured to dynamically modify NRTs using optimized NRTs generated by NI system 103.

Referring back to FIG. 1, NI system 103 is operatively connected to one or more network data (ND) depositories (not shown) associated with the network resource controllers 101 and/or Operation and Support System (OSS) 107.

NI system can be configured to operate in conjunction with a SON system 106 configured to operate in a Self Optimizing Network (SON) and to enable corrective actions with regard to one or more access points. The SON system 106 can be connected (by direct connection or through a mediation layer as, for example, OSS server) to access points 102. NI system can be operatively connected to the SON system or can constitute a part of the SON system.

NI system 103 can be operatively connected (directly or through the SON system) to OSS 107. Alternatively or additionally, NI system 103 can be operatively connected (directly or through mediation layer (e.g. SON system and/or OSS)) to ANRs.

NI system 101 comprises a processor 105 operatively coupled to a memory 104 and configured to enable operations as detailed with reference to FIGS. 3-7.

The NI system is configured to continuously receive network-related data from one or more ND depositories and to accommodate the received data and/or derivatives thereof in the memory 104. Unless specifically stated otherwise, it is appreciated that throughout the specification the terms "continuously receiving data" refers to receiving (in push or pull mode) data substantially each time a new data is available to the NI system (e.g. with a period specified as minimal collection time for a certain ND depository, or with a period specified as minimal collection time for a group of certain ND depositories, in near real-time mode, etc.). In "pull" mode, the availability of new data can be defined by configuration of the NI system specifying when to pull the data. The term "continuously obtaining data" refers to continuously receiving a given required data and/or processing the continuously received data in order to derive the given required data.

The NI system is configured to process the received network-related data to derive data indicative of HO-related events registered during a certain period. Unless specifically stated otherwise, the term "HO-related events" should be expansively construed to cover successful and unsuccessful handover attempts from a source AP to target APs included in NRT and missing neighbors events, i.e. events of identifying (e.g. based on signal level and SNR measurements) potential target APs non-included in a respective NRT. As will be further detailed with reference to FIGS. 3-7, depending on a use case, processing can be provided continuously, in a scheduled manner and/or responsive to predefined events.

The NI system is further configured to determine, for each given pair of a source AP and a neighbor AP, a coupling value (referred to hereinafter as a geo-impact) which quantifies a degree of radio frequency coupling between a source AP and a neighbor AP.

As will further detailed with reference to FIGS. 3-7, the NI system is configured to use the observed HO-related events and the determined geo-impact for generating optimized neighbor lists and enabling respective modification of existing NRTs.

Those versed in the art will readily appreciate that the teachings of the presently disclosed subject matter are not bound by the network architecture illustrated in FIG. 1; equivalent and/or modified functionality can be consolidated or divided in another manner and can be implemented in any appropriate combination of software with firmware and/or hardware. The NI system can be a standalone network entity, or integrated, fully or partly, with other network entities.

Figure 3:
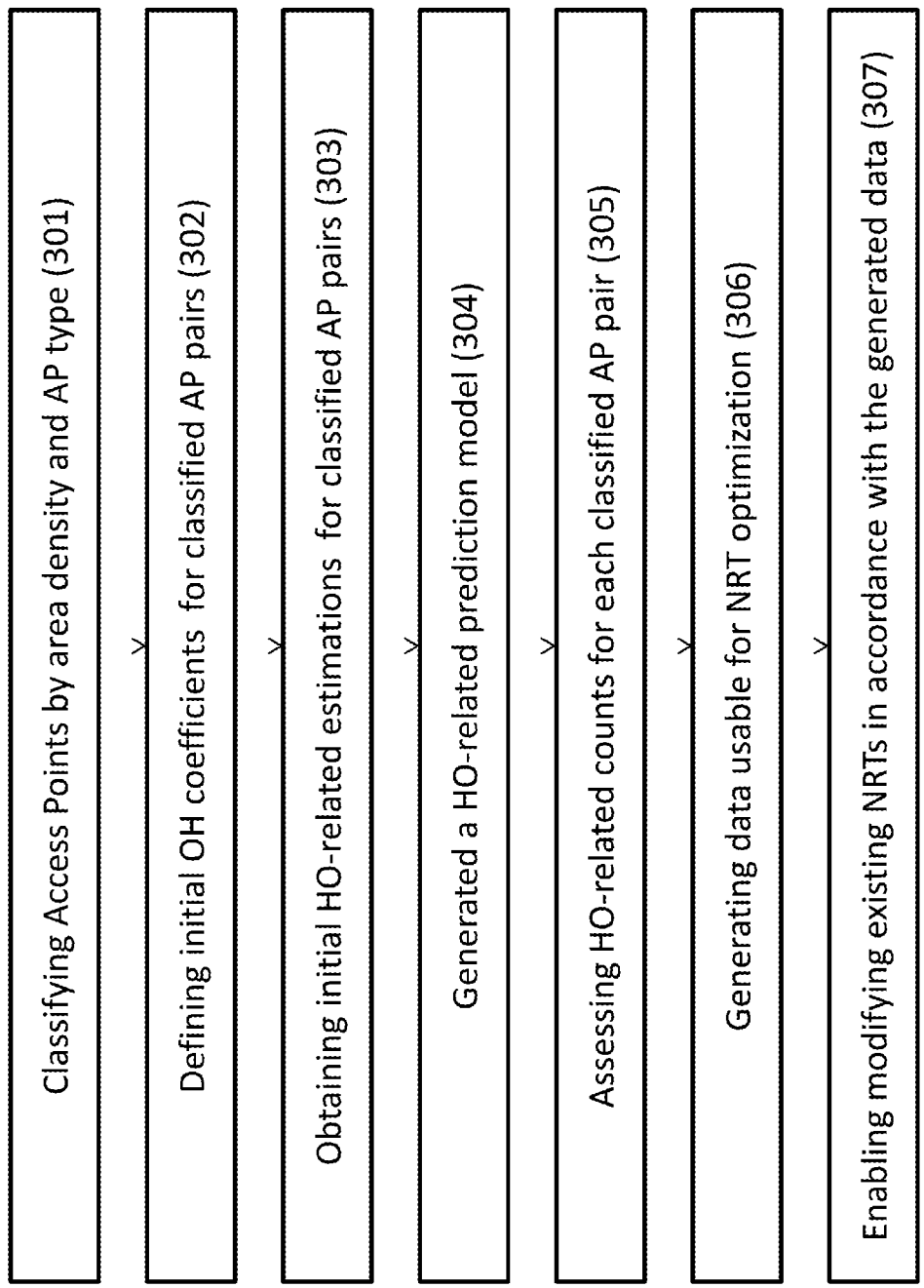
FIG. 3 illustrates a generalized flow diagram of optimizing neighbor relation tables (NRTs) in accordance with certain embodiments of the presently disclosed subject matter.

Referring to FIG. 3, there is illustrated a generalized flow diagram of optimizing neighbor relation tables (NRTs).

In accordance with certain embodiments of the presently disclosed subject matter, for each given source AP, NI system obtains (303) initial HO-related estimations (e.g. geo-impact and number of measured HO-related events from AP, (MEAS)) for pairs constituted by the given source AP and all neighbouring APs located in a predefined range, wherein these neighbouring APs can be considered as target candidates for NRT associated with the given source AP. By way of non-limiting example, the candidate target APs can be located in the range R=D*5, where D is an average distance to 10 closest APs located at different locations.

Geo-impact can be determined as a function of path loss calculated between the source and the target APs. By way of non-limiting example, allowed path loss range (e.g. 60-160 dB) can be normalized to geo-impact range values (e.g. 100-0). Geo-impact for path loss values above 160 dB can be assumed as equal to zero.

For purpose of illustration only, the following description is made with respect to calculating path loss (and, accordingly, geo-impact parameters) using the Okumura-Hata propagation model. Those skilled in the art will readily appreciate that the teachings of the presently disclosed subject matter are, likewise, applicable to other models suitable for calculating a degree of radio frequency coupling between access points (e.g. Deygout, Ray-tracing model, etc.).

Figure 4:
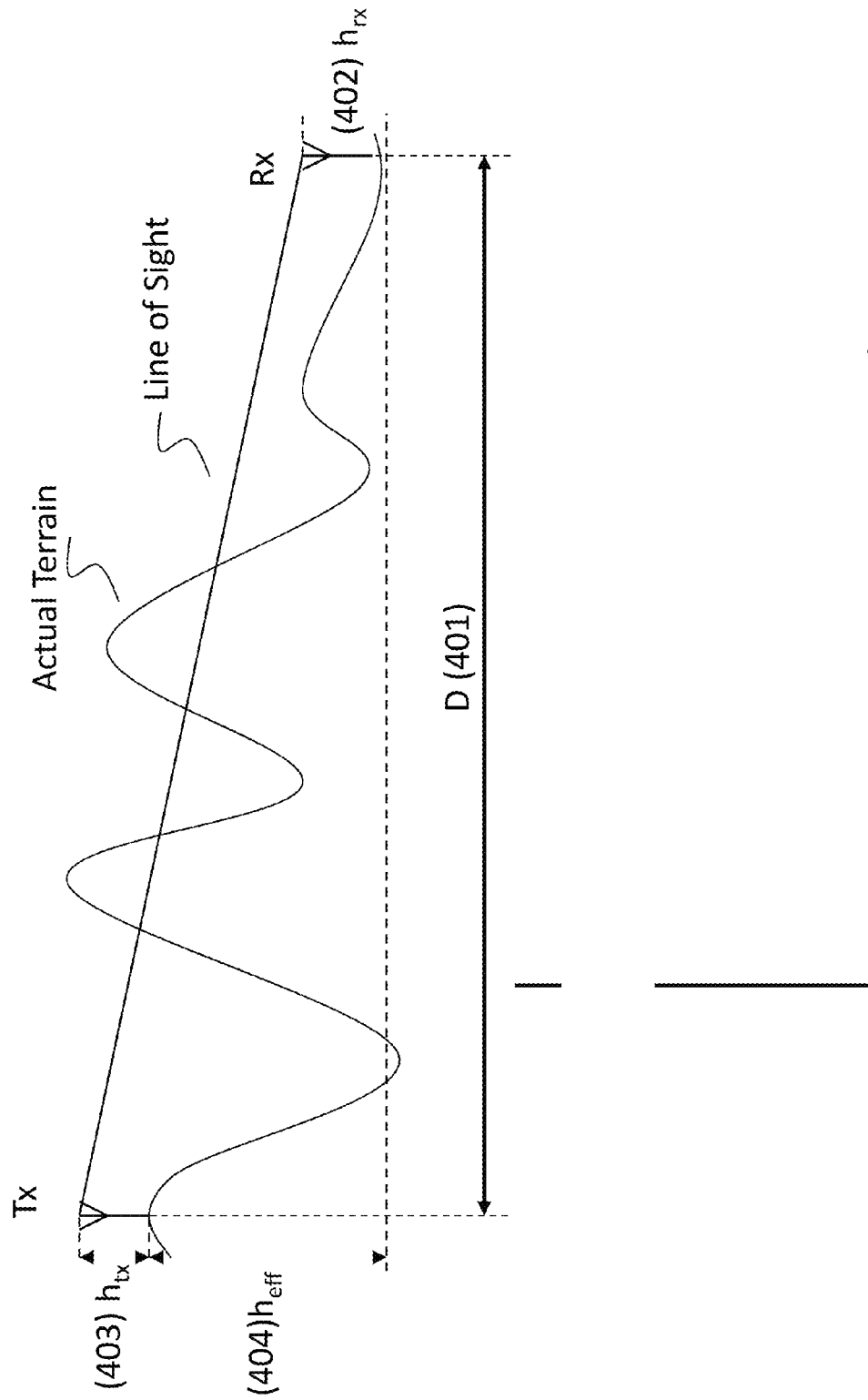
FIG. 4 illustrates a schematic diagram representing notation in Okumura-Hata (OH) model.

The Okumura-Hata model is an approximation of radio wave propagation characteristics in various areas, such as open land, suburbs, a medium city, and a large city (e.g. see M. Hata, "Empirical formula for propagation loss in land mobile radio services", IEEE Trans. Veh. Tech., vol. 29, no. 3, pp. 317-325, 1980. incorporated herein by reference). FIG. 4 illustrates a schematic diagram representing Okumura-Hata (OH) notation for a signal with frequency f, distance d (401) between transmitter and receiver; antenna height of the transmitter $h_{TX}$ (402); antenna height of the receiver $h_{RX}$ (403) and effective antenna height $h_{\mathit{eff}}$ (404).

In accordance with the OH model, path loss PL=A+B log(d)+C, wherein coefficient A=69.55+26.16 log(fc)−13.82 log(hb)−a(hm); coefficient B=44.9−6.55 log(hb); hb is the height of serving AP; hm is the height of mobile and fc−frequency.

In accordance with certain embodiments of the presently disclosed subject matter, OH coefficients have been replaced with optimization variables, namely:

$$A' = OH\_1 + OH\_2 \log(fc) - OH\_3 \log(hb) - a(hm)$$

$$B' = OH\_4 - OH\_5 \log(hb)$$

The following Table 1 presents coefficient C and function a(hm) for different area types as defined in an OH model and as modified in accordance with certain embodiments of the presently disclosed subject matter, replacing OH coefficients with optimization variables.

TABLE 1

| Area Type | OH Model | OH Model modified in accordance with certain embodiments of the presently disclosed subject matter |
|---|---|---|
| Urban | a(hm) = (1.1 log(fc) − 0.7)hm − (1.56 log(fc) − 0.8) C = 0 | a'(hm) = (OH_urban_a1 log(fc) − OH_urban_a2)hm − (OH_urban_a3 log(fc) − OH_urban_a4) C' = OH_urban_C |
| Dense urban | a(hm) = 3.2(log(11.75hm)$\hat{\,}$2 − 4.97 C = 0 | a'(hm) = OH_dense_a1(log(OH_dense_a2 hm)$\hat{\,}$2 − OH_dense_a3 C' = OH_dense_C |
| Suburban | a(hm) - same as urban C = −2[log(fc/28)]$\hat{\,}$2 − 5.4 | a'(hm) - same as urban C' = OH_suburban_c1 [log(fc/OH_suburban_c2)]$\hat{\,}$2 − OH_suburban_c3 |
| Rural | a(hm) - same as urban C = −4.78[log(fc)]$\hat{\,}$2 + 18.33 log(fc) − 40.98 | a'(hm) - same as urban C' = OH_rural_c1 [log(fc)]$\hat{\,}$2 + OH_rural_c2 log(fc) − OH_suburban_c3 |

Referring back to FIG. 3, in accordance with certain embodiments of the presently disclosed subject matter, prior to calculating initial geo-impact, NI system classifies (301) APs by AP density and AP type, and thereby defines (302)

initial Okumura-Hata (OH) parameters applicable for path loss calculation for respective pairs.

A given AP can be classified by area density in accordance with average distance (D) between the given AP and pre-defined number of closest APs. By way of non-limiting example, the number of closest APs can be selected as equal to 10, and AP classification by area density can be provided in accordance with Table 2 below:

TABLE 2

| D, meters | Area Density for calculating OH coefficients |
|---|---|
| D < A | Dense urban area |
| A ≤ D < B | Urban area |
| B ≤ D < C | Suburban area |
| D ≥ C | Rural area |

The constants A, B and C in Table 2 can be empirically defined by experts.

For calculating (302) initial OH coefficients, APs are further classified by AP type: a given AP can be of a macro-cell type or of non-macro-cell type. AP is classified as a non macro-cell AP if it meets at least one of the following criteria:
AP has non-empty CellType value in physical data, wherein this value is equal to non-macro value (FEMTO, PICO, MICRO, etc.);
AP scrambling code is in a range allocated for small cells;
AP height is below a defined threshold (e.g. 5 m).

Depending on AP type, initial OH coefficients for path loss calculation are defined in accordance with Table 3.

TABLE 3

| | | Calculating for AP of macro-cell type | Calculating for AP of non-macro cell type |
|---|---|---|---|
| Path Loss | For path from source AP to target AP ($PL_{out}(AP_s, AP_t)$) | Calculated with OH coefficients corresponding to area density classification of $AP_s$ | Calculated with OH coefficients corresponding to dense urban area |
| | For path from target AP to source AP ($PL_{in}(S, T)$) | Calculated with OH coefficients corresponding to area density classification of $AP_t$ | Assumed to be equal to maximal path loss (160 dB) |
| Azimuth path loss | For path from source AP to target AP ($PL_{out}(AP_s, AP_t)$) | Calculated with respect to azimuth difference between $AP_s$ and vector to $AP_t$ using default antenna pattern (65° beamwidth) | Assumed to be equal to 20 dB (regardless of direction) |
| | For path from target AP to source AP ($PL_{in}(AP_s, AP_t)$) | Calculated with respect to azimuth difference between $AP_t$ and vector to $AP_s$ using default antenna pattern (65° beamwidth) | Assumed to be equal to 0 dB (regardless of direction) |

Path loss $PL(AP_s, AP_t)$ between a source $AP_s$ and a target $AP_t$ can be calculated as follows:

$$PL(AP_s, AP_t) = \frac{(PLout(APs, APt) + PLin(APs, APt))}{2} + Min(Azimuth\_PL(AP_s), Azimuth\_PL(AP_t)),$$

wherein $PL_{out}(AP_s, AP_t)$ is path loss calculated for outgoing path from source $AP_s$ to target $AP_t$, $PL_{in}(AP_s, AP_t)$ is incoming path loss calculated for path from target $AP_t$ to source $AP_s$, Azimuth_PL($AP_s$) is outgoing azimuth path loss calculated for path from source $AP_s$ to target $AP_t$ and Azimuth_PL($AP_t$) is incoming azimuth path loss calculated for path from target $AP_t$ to source $AP_s$.

Following is a non-limiting example of initial estimation of path loss for a pair of a source $AP_s$ being a macro cell located at an average distance of 750 m to its 10 nearest neighboring sites, and of a target $AP_t$ being a micro cell located at an average distance of 5 km to its 10 nearest neighboring sites. In accordance with rules detailed above, $AP_s$ shall be classified as "Macro, Urban area" and $AP_t$ shall be classified as "Micro, Open area". Accordingly, as detailed in Table 3, the path loss between these APs shall be calculated using the initial OH coefficients corresponding to urban area for $PL_{out}(AP_s)$ and initial OH coefficients corresponding to metropolitan area for $PL_{in}(AP_t)$ (equation YYY in OH model). The respective pair will be, accordingly, classified as ($AP_s$ "Macro, urban area density; $AP_t$ "Micro, Open area").

Initial geo-impact (e.g. 20%) corresponds to the initial path loss (e.g. 100 dB) and can be estimated using initial OH coefficients. In order to obtain (303) initial geo-impact for ($AP_s$, $AP_t$) pairs for all neighbouring $AP_t$ located in a predefined range, the NI system can provide operations 301 and 302 by itself, or can receive at least some respective data from an external source.

Initial HO-related estimation of a given pair ($AP_s$, $AP_t$) can be provided as a function (e.g. multiplication) of initial geo-impact determined for the pair and an average number of measured HO-related events from $AP_s$. Optionally, handover related estimation can be provided separately for handover attempts and for missing events. Geo-impact (Impact$_{Geo}$) is calculated as a function of classification, distance and azimuth in a manner detailed above and Impact$_{MEAS}$=#HO Attempts/sum(#Ho Attempts+# of missing events).

However, initial OH coefficients can be not sufficiently accurate for a given geographical environment. Accordingly, upon obtaining initial HO-related estimations, NI system generates (304) a prediction model to be used for predicting HO-related counts of the AP pairs. Prediction model can be generated for all neighbor relations and/or for subsets of neighbor (e.g. neighbors presented in respective neighbor lists, pairs grouped by area density and/or type of respective source and target APs, etc.).

Non-limiting examples of generating and using the prediction model are further detailed with reference to FIG. 5 and FIG. 6. Alternatively or additionally to these examples, OH coefficients can be optimized by any suitable supervised machine learning technique.

Optionally, the NI system can generate separate prediction sub-models: for predicting missing neighbor events counts (i.e. number of times when UE have measured exceeding a certain threshold signal of a target cell while being connected to a source cell); and for predicting HO attempts counts (i.e. the number of handovers from a given AP to target APs included in NRT).

Once the prediction model is ready (e.g. optimized OH coefficients have been defined or a training set (Impact$_{geo}$->Impact$_{MEAS}$) have been trained), NI system uses the generated predictive model to accurately predict MEAS counts per period of time (e.g. minimal collection time or longer) for any pair ($AP_s$, $AP_t$). Thus, NI system assesses (305) HO-related counts for pairs ($AP_s$, $AP_t$), each pair classified in accordance with area type and AP type classification of respective source and target APs; and generates (306) data usable for NRT optimization. The assessed HO-related counts can be stored in an assessment data structure accommodated in a memory of the NIS system. Assessment data structure comprises, for each given source AP, HO-related counts for all pairs constituted by the given source AP and neighbouring APs located in a predefined range (e.g. R=D*5). For each such ($AP_s$, $AP_t$) pair the assessment data structure accommodates data informative of assessed number of HO-related events per period (and/or, separately, successful and unsuccessful handover attempts from a source AP to a target AP and missing neighbor events), geo-impact calculated using the optimized OH coefficients, indication of belonging/non-belonging of $AP_t$ to respective NRT of APs, etc.). Data usable for NRT optimization can be generated by analysing data stored in the assessment data structure.

The NI system further enables (307) modifying existing NRTs in accordance with the generated data. The NI system can provide the generated data to the ANR system which can generate the optimized NRTs accordingly. Alternatively or additionally, the NI system can use the generated data to generate the optimized NRTs (and/or scripts for optimizing the existing NRTs) by itself and enable replacement of existing NRTs via the SON system.

By way of non-limiting example, generated data usable for NRT optimization can be informative of missing neighbors. For each source AP, NI system can rank potential target APs by a combination (e.g. linear) of $Impact_{meas}$ and $Impact_{geo}$. Those target APs that are ranked high in the list and for which neighbor relation with source AP are not defined, can be declared as missing neighbors and neighbor relation can be provisioned as a part of NRT optimization.

By way of another non-limiting example, generated data usable for NRT optimization can be indicative of incorrectly defined (invalid) neighbors in NRT and/or include suggestions of neighbors' replacement. For example, it can happen in the cellular network that the same identity code is used both by a distant AP included in NRT and by a close AP non-included in NRT. In such a case, a UE could measure a strong signal coming from the non-included AP, and, as a result, initiate handover to the included distant AP having, actually, a low signal because of its distance. Such a collision situation can cause call drop. The NI system can analyse data stored in the assessment data structure to identify pairs ($AP_s$, $AP_t$) for which $Impact_{geo}$ is lower than a collision criterion, while $Impact_{meas}$ is higher than a collision criterion. Collision criteria can be predefined or can be defined by analyzing data stored in the assessment data structure. Such identified pairs can, potentially, suffer from a collision situation. For each such identified $AP_s$, the NI system further searches the assessment data structure for a pair with another $AP'_t$, such pair ($AP_s$, $AP'_t$) having $Impact_{geo}$ significantly higher than the pair ($AP_s$, $AP_t$). $AP'_t$, if not included in NRT, can be recommended for replacing $AP_t$ in NRT of the respective $AP_s$. The generated recommended pairs of $AP_s$ potentially having a collision problem and $AP'_t$ having sufficient geo-impact, can be included in the data usable for NRT optimization. The approach above can enable solution of collision problems with no need for a service-affecting procedure of re-planning identity codes.

By way of another non-limiting example, data for NRT optimization can be usable in a network shared between 2 or more cellular operators, wherein each operator has partial access to HO-related data. Optimized OH coefficients and/or recommended pairs provided by NI system for the entire network can enable more accurate results, compared to individual NRT planning on network node level and/or based on the partial HO-related data.

Likewise, generated data can be usable for initial setting of load balancing parameters for newly added cells. Initial setting can include:
  calculating geo-impact for all pairs between a new AP and APs within a predefined range;
  using the prediction model for predicting amount of incoming handovers to the new cell and comparing the predicted amount to an average number of handovers to existing APs in its immediate vicinity (e.g. a predefined number of the most close APs);
  if the predicted amount is significantly higher than the average number (e.g. #predicted (APs)>avg #HO(n)+2*std HO(n), where HO(n) is a distribution of # HO counts measured per each AP in immediate vicinity of $AP_s$), set AP footprint, AP selection and/or AP reselection parameters to "traffic decreasing" values, and if the predicted amount is significantly lower, set AP footprint, AP selection and AP reselection parameters to "traffic increasing" values.

By way of non-limiting example, adjusting load balancing parameters for increasing or decreasing AP traffic can be provided in accordance with teachings of U.S. patent application Ser. No. 14/955,389 entitled "Method of controlling traffic in a cellular network and system thereof", assigned to the Assignee of the present application and incorporated herewith by reference in its entirety.

Alternatively or additionally, the generated data for NRT optimization can be usable to enable prioritized services between clients having different values for a cellular operator. By way of non-limiting example, HO-related events originated by different clients (e.g. clients having different ARPU or otherwise prioritized, clients moving over highways and/or railways, located at predefined areas, etc.) can be provided with different weights when training the prediction model. When operating, HO-related counts are assessed using, inter alia, data inputs related to prioritization. As a result, the assessed HO-related counts (and accordingly, the provided services) will be optimized with regard to the prioritized clients. Likewise, the NI system can provide different weights to HO-related events associated with APs prioritized in accordance with clients' prioritization. By way of non-limiting example, prioritizing APs in accordance with clients' prioritization can be provided in accordance with teachings of International Patent Application No. PCT/IL2015/050780 entitled "Method of operating a self organizing network and system thereof", assigned to the Assignee of the present application and incorporated herewith by reference in its entirety. As a result, the assessed HO-related counts (and accordingly, the provided services) will be optimized with regard to the prioritized APs.

Figure 5:
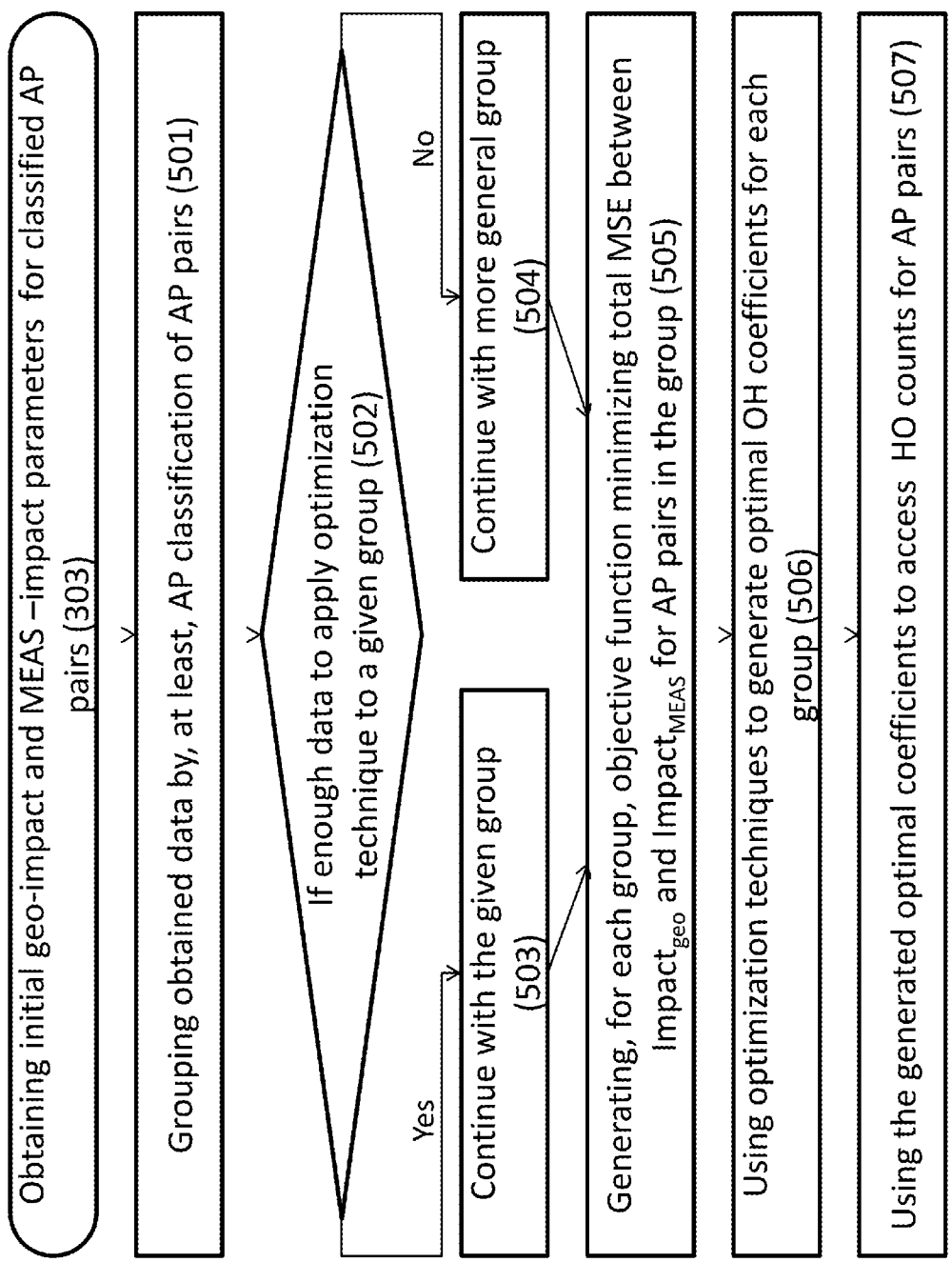
FIG. 5 illustrates a generalized flow diagram of a non-limiting example of generating a prediction model in accordance with certain embodiments of the presently disclosed subject matter.

Referring to FIG. 5, there is illustrated a generalized flow diagram of a non-limiting example of generating a prediction model in accordance with certain embodiments of the presently disclosed subject matter.

Upon obtaining (303) initial HO-related estimations comprising $Impact_{geo}$ and $Impact_{MEAS}$ parameters, NI system groups (501) the obtained data by classification of the respective ($AP_s$, $AP_t$) pairs, each pair classified in accordance with area type and AP type classification of respective source and target APs. For each given source AP, initial HO-related estimations are obtained for all pairs constituted by the given source AP and neighbouring APs located in a predefined range (e.g. R=D*5).

Optionally, the NI system can provide further grouping within the generated groups. Such further grouping can be provided in accordance with NRT data (e.g. existence of a target AP in NRT associated with a source AP), type of HO-related events (missing neighbor events, successful HOevents, etc.), priority of respective source APs, etc. For each given group, NI system checks (502) if data related to the given group are sufficient for applying an optimization technique thereon. If Yes, the NI system continues generating the prediction model with regard to the given group (503), and if No, NI system continues the process with regard to a more general group (504) comprising the given group and comprising enough data for applying the optimization technique.

For each group appropriate for applying optimization technique, the NI system generates objective function minimizing mean square error (MSE) between $\text{Impact}_{Geo}$ and $\text{Impact}_{MEAS}$ for AP pairs in the group:

$$\text{TargetFunction} = \min \text{sum}[\text{Impact}_{Geo}(AP_s, AP_t) - \text{Impact}_{MEAS}(AP_s, AP_t)]^2,$$

wherein $\text{Impact}_{MEAS}$=#HO Attempts/sum(#Ho Attempts+# of Measurements) and $\text{Impact}_{Geo}$ ($AP_s$, $AP_t$) is geo-impact calculated as a function of distance and azimuth in a manner detailed with reference to FIG. 3, but using iteratively optimized OH coefficients.

The NI system uses suitable optimization techniques to generate (506) optimal OH coefficients for each group, the coefficients usable (507) for accessing HO counts for respective AP pairs.

Figure 6:
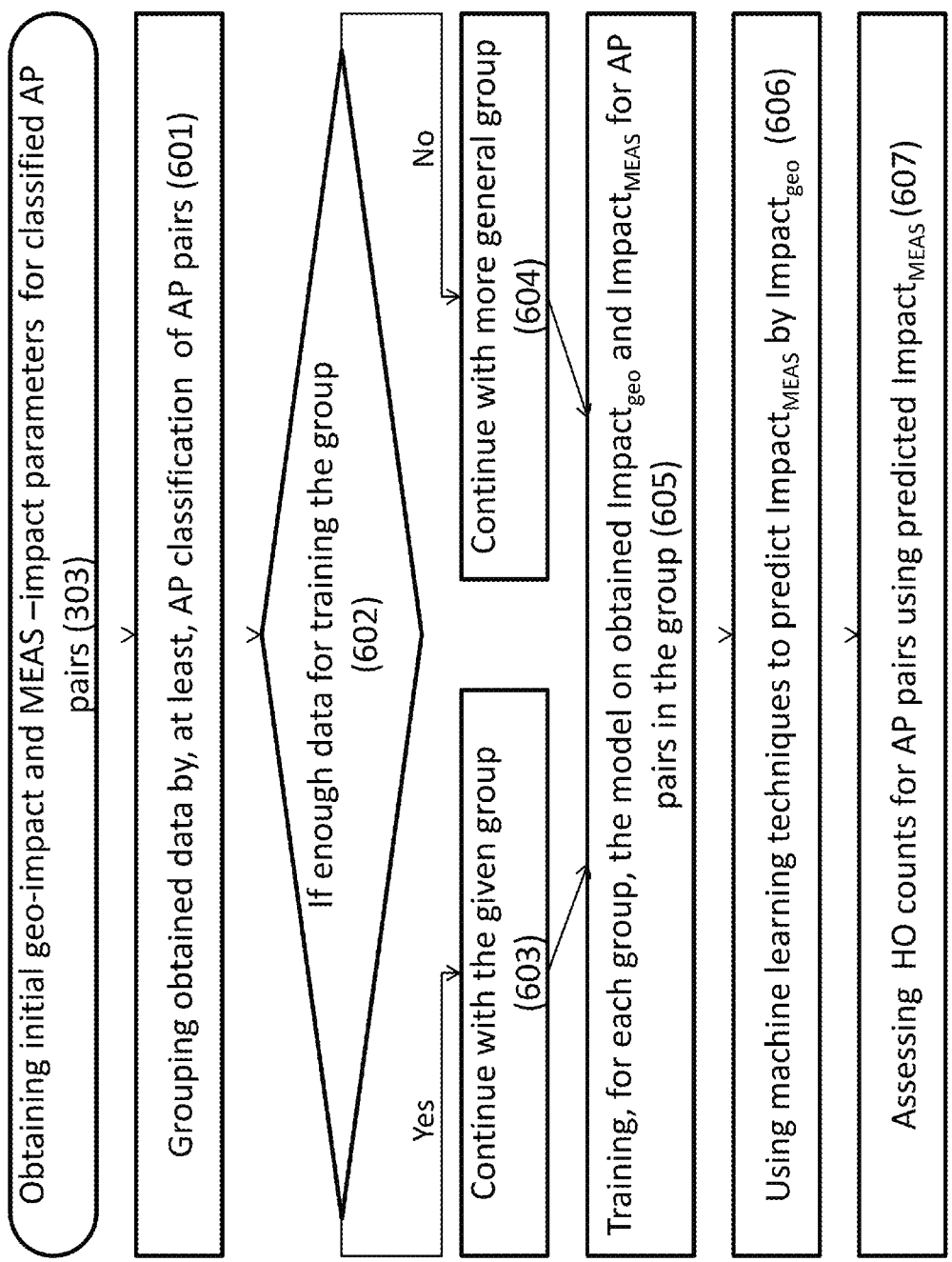
FIG. 6 illustrates a generalized flow diagram of another non-limiting example of generating a prediction model in accordance with certain embodiments of the presently disclosed subject matter.

FIG. 6 illustrates a generalized flow diagram of another non-limiting example of generating a prediction model in accordance with certain embodiments of the presently disclosed subject matter.

Likewise in the flow diagram illustrated in FIG. 5, the NI system groups (601) the obtained data by classification of the respective ($AP_s$, $AP_t$) pairs, and checks (602), for each given group, if data related to the given group are sufficient for training the group. If Yes, the NI system continues with the given group (603); and if No, the NI system continues the process with regard to a more general group (604) comprising the given group and comprising enough data for training.

For each group appropriate for training (e.g. a group of "similar" cells), the NI system trains (605) a model predicting $\text{Impact}_{MEAS}$ by $\text{Impact}_{Geo}$ on obtained $\text{Impact}_{Geo}$ and $\text{Impact}_{MEAS}$ data, and uses appropriate machine learning technique (e.g. regression decision tree, etc.) to predict (606) $\text{Impact}_{MEAS}$ by $\text{Impact}_{Geo}$. The NI system further analytically assesses (607) HO counts for respective AP pairs using the predicted $\text{Impact}_{MEAS}$ data.

NI system trains the prediction model using HO-related data collected during a substantial period (e.g. over a few weeks) with unchanged footprint of APs. The NI system can re-start training in response to an event (e.g., an addition or removal of APs from a network, in response to a certain number of complaint calls), and/or in a scheduled manner.

Figure 7:
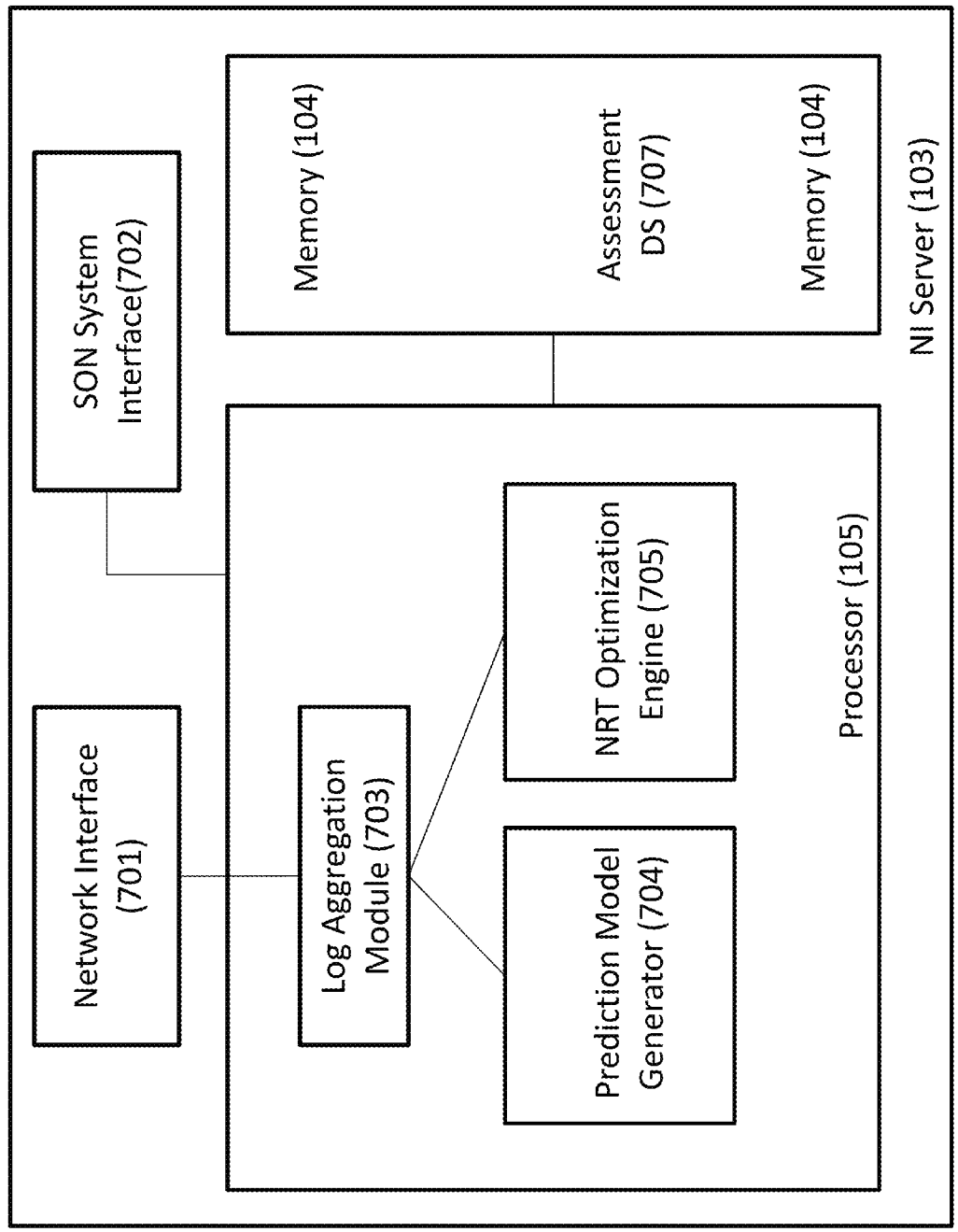
FIG. 7 illustrates a generalized functional diagram of an NI system in accordance with certain embodiments of the presently disclosed subject matter.

Referring to FIG. 7, there is illustrated a generalized functional diagram of the NI system in accordance with certain embodiments of the presently disclosed subject matter. NI system 101 can be implemented as a standalone platform or integrated, fully or partly, with other network entities (e.g. SON system, OSS, etc.). NI system comprises the processor (105) operatively coupled to a first hardware-based interface (701) (e.g. a first port) and a second hardware-based interface (702) (e.g. a second port). The first interface (referred to hereinafter also as a network interface) is configured to receive from ND depositories data informative of network events and to forward the received data thereof to the processor 105 and/or memory 104 operatively coupled to the processor. The received data and/or derivatives thereof are stored in network event database 706. The second interface (referred to hereinafter also as SON interface) is configured to communicate with SON system 106 and to provide to SON system data usable for NRT optimization. Optionally, the NI system can communicate via the second interface with the SON system to receive data indicative of changes in the cellular network provided by the SON system. The processor 105 is configured to provide necessary processing in accordance with operations detailed with reference to FIGS. 2-8. Optionally, the NI system can also include a user interface (not shown) to enable supervised training and/or other user inputs.

The processor 105 can be configured to execute several functional modules in accordance with computer-readable instructions implemented on a non-transitory computer usable medium. Such functional modules are referred to hereinafter as comprised in the processor. The processor can comprise operatively coupled log aggregation module 703, prediction model generator 704 and NRT optimization engine 705. The log aggregation module 703 can be configured to process network-related data (e.g. to extract HO-related data, etc.) prior to storing the aggregated log records and/or derivatives thereof in database 706. The prediction model generator 704 can be configured to generate and train the prediction model as detailed with reference to FIGS. 3, 5 and 6. NRT optimization engine 705 can be configured to use the trained prediction model for assessing HO-related parameters and generating data usable for NRT optimization.

It is to be understood that the presently disclosed subject matter is not limited in its application to the details set forth in the description contained herein or illustrated in the drawings. The disclosed technique is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method of optimizing neighbor relation tables (NRTs) of access points in a cellular network comprising a plurality of access points (APs), the method comprising:

a) obtaining, by a computer, initial handover-related estimations for AP pairs each constituted by a given source AP and its neighbouring APs located in a predefined range and thereby considered as candidates for an NRT of the given sourceAP;

b) generating, by the computer, a handover (HO) prediction model;

c) using the generated HO prediction model to assess, by the computer, HO-related counts for each AP pair of the AP pairs;
d) using the assessed HO counts to generate, by the computer, data to be used for NRT optimization; and
e) enabling, by the computer, modifying candidates in at least one NRT in accordance with the generated data, thereby optimizing the at least one NRT.

2. The method of claim 1, further comprising:
prior to said obtaining the initial HO-related estimations, classifying the APs of the plurality of APs by area density and AP type, thereby obtaining the classified AP pairs;
providing operations a) - e) for classified AP pairs.

3. The method of claim 1, wherein the initial HO-related estimation of a given AP pair of the AP pairs is provided as a predefined function of initial geo-impact determined to the given AP pair and an average number of measured events related to handover from respective source AP, wherein geo-impact quantifies a degree of radio frequency coupling between a source AP and a neighbor AP of the neighboring APs.

4. The method of claim 1, wherein the prediction model is generated based on one of the following: a) data informative of all the neighbouring APs located in the predefined range from source Aps and b) data informative of subsets of the neighbouring APs, the subsets selected in accordance with predefined criteria.

5. The method of claim 1, wherein the generated prediction model comprises a first sub-model configured to predict missing neighbor events counts and a separate second sub-model configured to predict HO attempts counts.

6. The method of claim 1, wherein said generating the prediction model comprises training the prediction model using different weights for HO-related events originated by clients having different priorities for a cellular operator.

7. The method of claim 1, wherein the data to be used for NRT optimization are informative of missing neighbors of the given source AP, and wherein generating said data comprises ranking candidates for the NRT of the given AP, and defining a missing neighbor as a candidate missing in the NRT whilst having a rank higher than a candidate presented in the NRT.

8. The method of claim 1, wherein the data to be used for NRT optimization are informative of incorrectly defined neighbors included in the at least one NRT.

9. The method of claim 1, wherein the data to be used for NRT optimization are used in a network shared between two or more cellular operators, wherein each operator has partial access to HO-related data.

10. The method of claim 1, wherein the data to be used for NRT optimization are used for initial setting of load balancing parameters for newly added cells.

11. The method of claim 1, wherein the data to be used for NRT optimization are used to prioritize services between clients having different priorities for a cellular operator.

12. A computerized system configured to generate data to be used for optimizing neighbor relation tables (NRTs) of access points in a cellular network comprising a plurality of access points (APs), the system comprising a processor operatively connected to a memory, wherein the processor is configured to:
obtain initial handover-related (HO) estimations for AP pairs of the plurality of APs, each AP pair constituted by a given source AP and its neighbouring APs located in a predefined range and thereby considered as candidates for an NRT of the given source AP;
generate a handover (HO) prediction model;
use the generated HO prediction model to assess HO counts for each AP pair of the AP pairs; and
use the assessed HO counts to generate data to be used for NRT optimization;
wherein the system is further configured to enable modifying the candidates in at least one NRT of the NRTs in accordance with the generated data, thereby enabling the optimization of the at least one NRT.

13. The system of claim 12, wherein the processor is configured to calculate the initial HO-related estimation of a given AP pair of the AP pairs using a predefined function of initial geo-impact determined to the given pair and of an average number of measured events related to handover from respective source AP of the plurality of APs.

14. The system of claim 12 configured to obtain at least part of the initial HO-related estimations by receiving the estimations from an external source.

15. The system of claim 12 further comprising a hardware-based network interface configured to continuously receive network-related data from one or more network depositories, wherein the memory is configured to accommodate the received network-related data and/or derivatives, and wherein the processor is further configured to process the received network-related data to derive data indicative of HO-related events registered during a certain period.

16. The system of claim 12, wherein the memory is configured to accommodate a data structure comprising, for each given source AP, HO counts for all pairs of the AP pairs constituted by the given source AP and neighbouring APs located in the predefined range.

17. The system of claim 12, wherein the prediction model is generated based on one of the following: a) data informative of all the neighbouring APs located in the predefined range from source APs and b) data informative of subsets of the neighbouring APs, the subsets selected in accordance with predefined criteria.

18. The system of claim 12, wherein the data to be used for NRT optimization are selected from a group consisting of:
data informative of missing neighbors of the given source AP;
data informative of incorrectly defined neighbors included in the at least one NRT;
data to be used in a network shared between two or more cellular operators, wherein each operator has partial access to HO-related data; and
data to be used for initial setting of load balancing parameters for newly added cells.

19. The system of claim 12 configured to enable the optimization of the at least one NRT by providing the generated data to an Automatic Neighbor Relation (ANR) system which generates at least one optimized NRT with the modified candidates.

20. The system of claim 12 configured to enable the optimization of the at least one NRT by using the generated data to generate a respective optimized NRT of the NRTs with the modified candidates and by enabling replacement of the at least one NRT via an Operation and Support System (OSS).

* * * * *

UNITED STATES PATENT AND TRADEMARK OFFICE
CERTIFICATE OF CORRECTION

PATENT NO. : 9,980,187 B2
APPLICATION NO. : 15/603585
DATED : May 22, 2018
INVENTOR(S) : Daniel Dribinski, Evgeny Finkel and Rafael Shachar It is certified that error appears in the above-identified patent and that said Letters Patent is hereby corrected as shown below:

In the Claims

Column 14, Line 57 - Column 15, Line 14 should read:
1. A computerized method of optimizing neighbor relation tables (NRTs) of access points in a cellular network comprising a plurality of access points (APs), the method comprising:
a) obtaining, by a computer, initial handover-related estimations for AP pairs each constituted by a given source AP and its neighbouring APs located in a predefined range and thereby considered as candidates for an NRT of the given source AP;
b) generating, by the computer, a handover (HO) prediction model;
c) using the generated HO prediction model to assess, by the computer, HO counts for each AP pair of the AP pairs;
d) using the assessed HO counts to generate, by the computer, data to be used for NRT optimization; and
e) enabling, by the computer, modifying candidates in at least one NRT in accordance with the generated data, thereby optimizing the at least one NRT.

Column 15, Line 57 - Column 16, Line 12 should read:
12. A computerized system configured to generate data to be used for optimizing neighbor relation tables of access points in a cellular network comprising a plurality of access points (APs), the system comprising a processor operatively connected to a memory, wherein the processor is configured to:
obtain initial handover-related (HO) estimations for AP pairs of the plurality of APs, each AP pair constituted by a given source AP and its neighbouring APs located in a predefined range and thereby considered as candidates for an NRT of the given source AP;
generate a handover (HO) prediction model;
use the generated HO prediction model to assess HO counts for each AP pair of the AP pairs; and
use the assessed HO counts to generate data to be used for NRT optimization;
wherein the system is further configured to enable modifying candidates in at least one NRT in accordance with the generated data, thereby enabling the optimization of the at least one NRT.

Signed and Sealed this
Seventh Day of August, 2018

Andrei Iancu
*Director of the United States Patent and Trademark Office*

Column 16, Lines 53 - 57 should read:
19. The system of claim 12 configured to enable the optimization of the at least one NRT by providing the generated data to an Automatic Neighbor Relation (ANR) system which generates an optimized at least one NRT with the modified candidates.

Column 16, Lines 58 - 63 should read:
20. The system of claim 12 configured to enable the optimization of the at least one NRT by using the generated data to generate a respective optimized NRT with the modified candidates and by enabling replacement of the at least one NRT via an Operation and Support System (OSS).